Patented Oct. 13, 1953

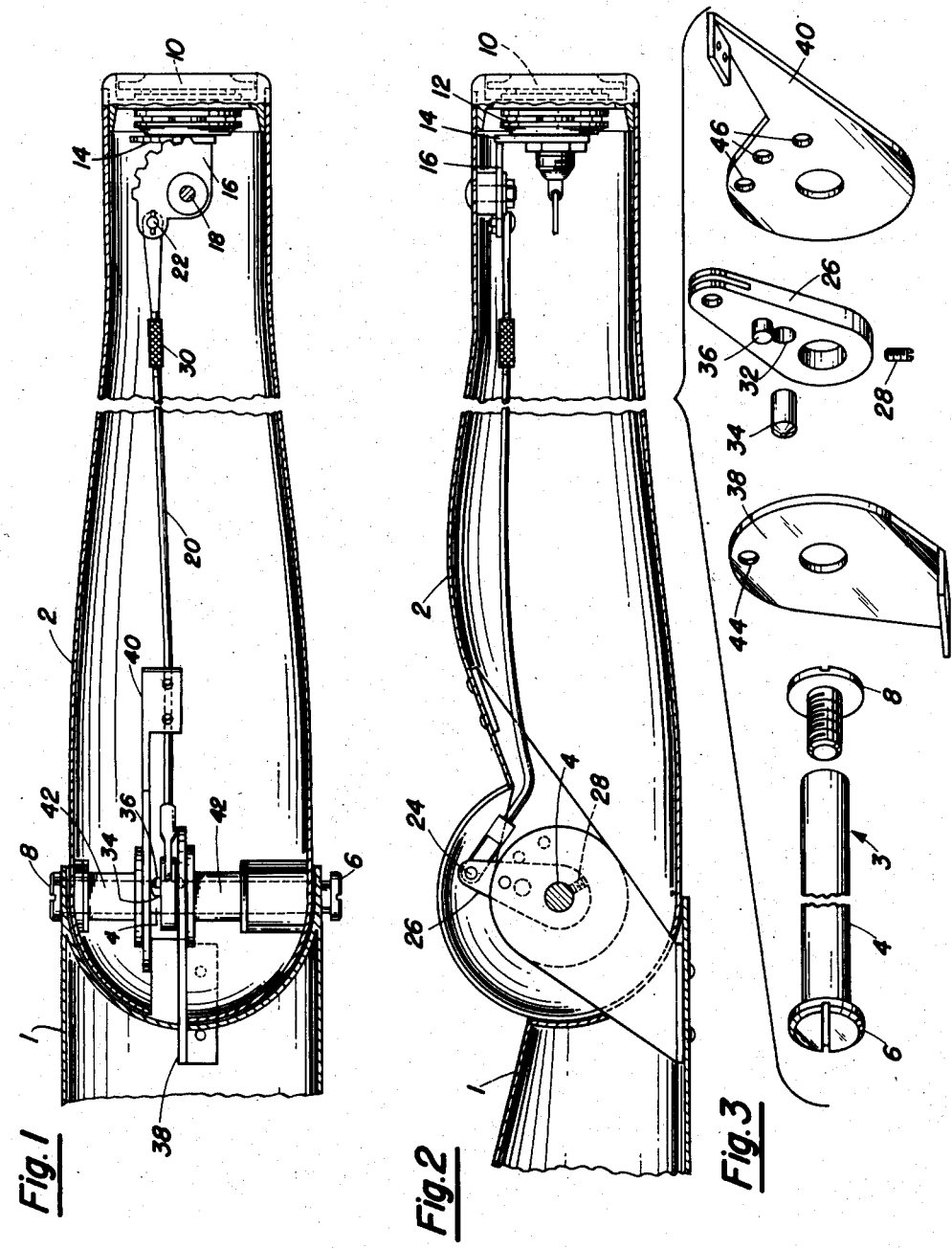

2,654,891

UNITED STATES PATENT OFFICE 2,654,891

MECHANICAL PRONATING AND SUPINATING WRIST

George B. Robinson, Napa, Calif.

Application July 2, 1952, Serial No. 296,979

4 Claims. (Cl. 3—12.4)

(Granted under Title 35, U. S. Code (1952), sec. 266)

The invention described herein may be manufactured and used by and for the Government of the United States of America for governmental purposes without the payment of any royalties thereon or therefor.

This invention relates to prostheses and, more particularly, to a mechanical pronating and supinating wrist.

Prior art prostheses have provided for pronation and supination of the wrist but have suffered from the deficiency of involving complicated mechanisms likely to require repeated repair. An object of the present invention is therefor to provide a pronating and supinating wrist which is of simple construction and free from frequent need for repair.

Other objects and many of the attendant advantages of this invention will be readily appreciated as the same becomes better understood by reference to the following detailed description when considered in connection with the accompanying drawings wherein:

Fig. 1 is a cross-sectional view taken along a saggital plane of an arm prosthesis embodying the invention;

Fig. 2 is a cross-sectional view of the device of Fig. 1 taken along a mid-plane of the device perpendicular to the plane of Fig. 1; and Fig. 3 is an exploded view of the portion of the mechanism located in the elbow region of the prosthesis.

Reference is now made to Figs. 1 and 2, particularly, wherein the numeral 1 indicates the upper arm member and 2 the forearm of the prosthesis articulated at the elbow joint with an elbow bolt 3. The elbow bolt is conveniently made of three parts, the axle part 4 and the heads 6 and 8, screwed into the axle to hold the prosthesis in assembled relation. The elbow bolt is rotatably and slidably inserted through aligned openings in the upper arm and forearm and is somewhat longer than the thickness of the elbow joint so as to permit of being displaced axially. The forearm carries a wrist 10 mounted on bearings 12 for rotation, constituting pronation and supination, about the longitudinal axis of the arm. Non-rotatably fixed to the wrist for rotating it is a gear sector 14. Meshing with this gear sector is a second sector gear 16 carried on a pin 18 fixed in the forearm. For rotating the gear 16 there is provided a connecting rod 20 articulated at 22 to the gear 16 and at 24 to a lever arm 26, adjustably fixed to the elbow bolt 3 by means of a set screw 28. The connecting rod 20 is adjustable in length by means of a threaded collar 30.

The lever arm 26 is provided with a transverse aperture 32 extending through it and adapted to carry a pin 34 slidable in the aperture 32. The arm 26 also is provided with a driving pin 36, force fit or welded or otherwise rigidly fixed to it and extending outward from both sides of the arm 26. The arm 26 is fixed on the elbow bolt intermediate a pair of anchor plates 38 and 40, riveted or otherwise anchored to the upper arm and forearm, respectively. These anchor plates are held against lateral displacement away from each other by spacers 42. The anchor plate 38 is provided with an aperture 44 located eccentrically of the axis of the elbow bolt. In the anchor plate 40 lying on a circle of the same radius as the eccentric distance of the center of aperture 44 is a plurality of similar apertures 46. The pin 36 is at the same eccentric distance as the apertures 44 and 46 and is thus adapted to engage either the aperture 44 or one of the apertures 46 as the arm 26 is moved toward one or the other of the anchor plates. The pin 34 floating in the aperture 32 is sufficiently long to remain in contact with the surfaces of both anchor plate 38 and anchor plate 40, thus maintaining the plates 38 and 40 and the arm 26 in generally parallel planes to facilitate engagement of driving pin 36 with its intended apertures.

Operation

To cause rotation of the wrist in response to change in elbow angle, the elbow bolt 4 is slid into the position shown in Fig. 1, wherein the head 8 abuts its adjacent surface of the elbow joint, and the pin 36 of arm 26 is engaged with the aperture 44 in the anchor plate 38. This can be accomplished by the amputee pushing the head 8 against any convenient object. This being done, there has been created what amounts to a four-bar kinematic linkage, the links being designated by the reference characters assigned to the joints, thus: fixed link 24—4, 4—18, 18—22, and 22—24. If now the upper arm 1 is held stationary, rendering the link 24—4 a fixed link, and the forearm 2 is rotated by any of the usual means provided on such protheses, then there will be a constrained motion of all the links, each relative to the other, which means, in effect, that the gear 16 must rotate about the pin 18. This rotation of the gear 16 causes pronation or supination of the wrist 10 by virtue of its meshing with gear 14. In the arrangement shown, flexion of the elbow joint involves supination of the wrist while extension of the elbow involves pronation of the wrist.

The wrist can be locked at any of several desired positions of rotation about the longitudinal axis of the arm by sliding the elbow bolt from the position shown in Fig. 1 until the pin 36 disengages from aperture 44 and engages, alternatively, one of the apertures 46 in the anchor plate 40. This can be accomplished by the amputee rotating the forearm relative to the upper arm with the drive-pin engaged as in Fig. 1, and continuing this rotation until the pin 36 is aligned with the desired opening 46. He thereupon pushes the head 6 against a convenient object to disengage the pin 36 from plate 38 and engage it with plate 40. The wrist is then locked against further rotation about the longitudinal axis by virtue of the fact that the previously described four-bar linkage has been converted onto a three-bar linkage, conveniently designated by the reference characters assigned to each link, instead of the characters assigned to the joints, thus: 20, 16, 2.

It will be apparent that the reference position for pronation or supination can be varied by varying the setting of the arm 26 by means of the set-screw 28. Also, the number and location of the fixed positions can be varied by the number and location of apertures 46.

Obviously many modifications and variations of the present invention are possible in the light of the above teachings. It is therefore to be understood that within the scope of the appended claims the invention may be practiced otherwise than as specifically described.

What is claimed is:

1. A prosthesis comprising an upper arm; a forearm articulated with an elbow bolt at the elbow to the upper arm; a wrist mounted on said forearm for rotation about the longitudinal axis of said forearm; an anchor plate fixed to said upper arm and having a portion surrounding said elbow bolt, said portion including an aperture eccentric to the elbow axis; a second anchor plate fixed to said forearm and including a portion surrounding said elbow bolt, said portion including a plurality of apertures spaced along a circle described about the elbow axis of the same radius as the eccentric distance of said aperture in said first mentioned anchor plate; a lever arm adjustable about said elbow bolt and mounted on said bolt between said anchor plates; means for fixing said lever arm to said elbow bolt in adjusted position; a transverse aperture through said lever arm; a pin slidably mounted in said transverse aperture and extending outwardly from both sides of said arm so as always to remain in contact with both of said anchor plates; a driving pin rigidly fixed to said arm and extending outwardly from both sides thereof sufficiently to engage an aperture in one of said anchor plates and be disengaged from an aperture in said other anchor plate, said bolt being axially displaceable to engage said driving pin alternatively with each of said anchor plates; a gear fixed to said wrist about the axis of rotation of said wrist; a second gear carried by said forearm for meshing with said first gear; a connecting rod articulated at its one end to said second gear to drive the same and at its other end to said lever arm.

2. The device of claim 1 including means for adjusting the length of said connecting rod.

3. A prosthesis comprising an upper arm, a forearm articulated to said upper arm with an elbow bolt; a wrist mounted for rotation relative to said forearm about the longitudinal axis of said forearm; and means responsive to change of elbow angle for rotating said wrist about said axis, said last-named means including a lever arm fixed to rotate with said elbow bolt; a mechanism for pronating and supinating said wrist including a link pivoted to said forearm; a connecting rod pivoted to said lever arm and to said link; and means for alternatively fixing said lever arm against movement relative to said upper arm and against movement relative to said forearm.

4. The prosthesis of claim 3 wherein said means for fixing said lever arm against movement relative to said forearm is arranged to fix said lever arm in various angular positions relative to said forearm.

GEORGE B. ROBINSON.

References Cited in the file of this patent
UNITED STATES PATENTS

| Number | Name | Date |
|---|---|---|
| 1,507,682 | Pecorella et al. | Sept. 9, 1924 |
| 2,516,791 | Motis et al. | July 25, 1950 |